March 15, 1949.  E. H. MEIER ET AL  2,464,598
FLEXIBLE SECTION FOR WAVE GUIDES
Filed Aug. 30, 1943
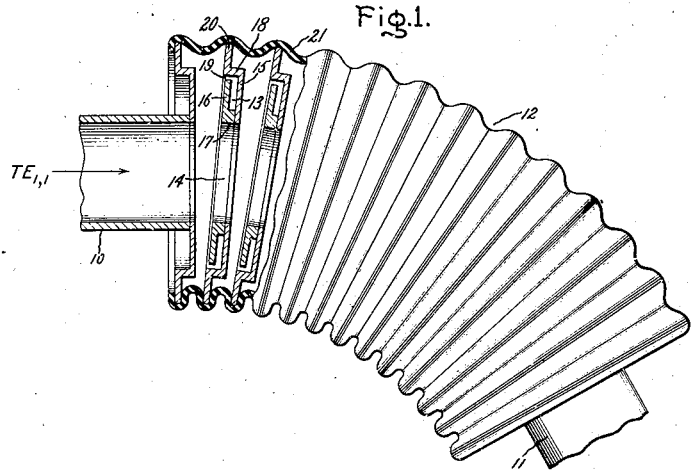
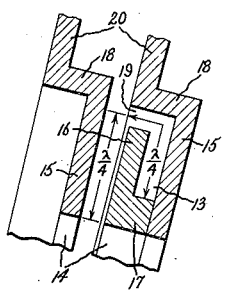
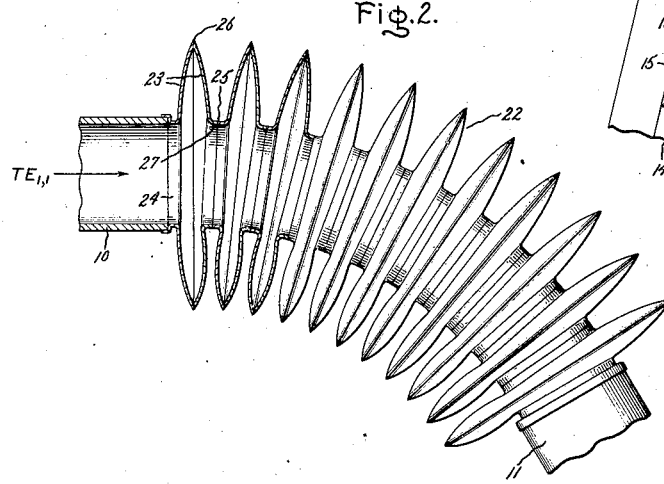
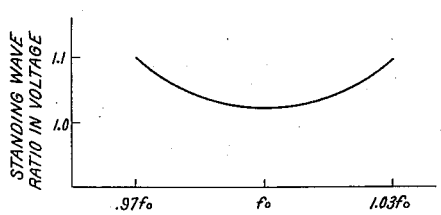
Inventors:
Edwin H. Meier,
Hubert J. Schlafly Jr.,
by Harry E. Dunham
Their Attorney.

Patented Mar. 15, 1949

2,464,598

UNITED STATES PATENT OFFICE 2,464,598

FLEXIBLE SECTION FOR WAVE GUIDES

Edwin H. Meier, Scotia, and Hubert J. Schlafly, Jr., Schenectady, N. Y., assignors to General Electric Company, a corporation of New York.

Application August 30, 1943, Serial No. 500,476

1 Claim. (Cl. 178—44)

Our invention relates to dielectric wave guides of the hollow pipe type used for transmission of ultra high frequency energy and, in particular, to a flexible section for use in such guides.

It is now rather generally understood that electromagnetic waves may be propagated through a metallic pipe of conductive material which contains a dielectric medium, if the frequency of the exciting electromagnetic waves is greater than a critical or minimum frequency, the value of which is established principally by the transverse dimensions of the guide structure. In the past, such guides have been used principally for propagation of electromagnetic waves in a direction along the axis of the guide. When adjacent sections of the guide are not axially aligned, reflections of the electromagnetic waves are set up which undesirably affect the transmission of power through the guide. However, it is desirable, especially in systems which employ wave guides for transmitting ultra high frequency waves from a transmitter to an oscillating or rotating antenna, to be able to use hollow pipes throughout without resorting to the expedient of converting to either a different mode or type of electromagnetic wave for propagation through the hollow pipe or of converting from the wave guide system to a coaxial or concentric transmission line system where each plane of freedom or rotation requires a separate set of conversions. Accordingly, it is an object of our invention to provide a new and improved flexible section for a wave guide of the hollow pipe type.

It is another object of our invention to provide a new and improved flexible section for a wave guide of the hollow pipe type which permits large angular movements between the portions of the wave guide connected to the flexible section.

It is a further object of our invention to provide a new and improved flexible section for a wave guide of the hollow pipe type in which large angular movement is permitted for a very short length of the wave guide.

It is still another object of our invention to provide a new and improved flexible section for a wave guide in which the losses of the high frequency waves are of negligible value regardless of the position of the section.

It is a still further object of our invention to provide a new and improved flexible section of a wave guide in which substantially no change in polarization of the electromagnetic wave propagated therethrough is produced.

It is another object of our invention to provide a new and improved flexible section of a wave guide particularly adapted for use in systems operating at pressures other than atmospheric.

It is another object of our invention to provide a new and improved flexible section for a wave guide system in which substantially no reflection of the electromagnetic wave propagated is caused as the direction of propagation of the electromagnetic wave is changed through a substantial angle.

It is a still further object of our invention to provide new and improved flexible sections for a wave guide system which is inexpensive and readily adapted to assembly by virtue of the relatively small number and simplicity of the parts involved.

One of the features of our invention is the forming of a flexible section of a wave guide comprising a plurality of closely spaced resilient metallic disks having central apertures aligned with the wave guide to which the section is connected, the radial length of the disks being made effectively equal to a half wave length of the wave propagated through the guide and each of said disks being connected at its inner and outer edges respectively to a different one of the adjacent disks to form therewith a short-circuited half wave length section of radial transmission line so that susbtantially no discontinuities in conductance are introduced along the inner edges of the disks.

In another embodiment of our invention the disks are constructed to constitute serially connected folded half wave chokes and the outer edges of the disks are connected by flexible means to secure the desired flexibility of the form.

For a better understanding of our invention, reference may be had to the following description taken in connection with the accompanying drawing and its scope will be pointed out in the appended claims. Fig. 1 diagrammatically illustrates an embodiment of our invention as applied to a dielectric wave guide of the circular hollow pipe type in which a plurality of folded half wave chokes is employed; Fig. 1a is an enlarged view of a portion of Fig. 1; Fig. 2 illustrates another embodiment of our invention applied to a similar wave guide utilizing a plurality of radial half wave chokes; and Fig. 3 is a curve illustrating certain operational characteristics of the flexible wave guide section of our invention.

In Fig. 1 there is shown a pair of longitudinally spaced sections 10, 11 of a dielectric wave guide of the circular hollow pipe type which are angularly disposed with respect to each other and are connected together through a flexible section 12 of the wave guide. Although our invention may be applied to dielectric wave guides of the hollow pipe type having various configurations, for the purpose of facilitating the description of the invention, we have chosen to consider a system which is used primarily for the transmission of a $TE_{11}$ type wave within a wave guide having a circular cross section. It is desirable that the wave guides 10 and 11 be metallic enclosures of a metal of high electric conductivity, such as copper, brass, or copper- or silver-plated steel.

The flexible section 12 comprises a plurality of closely spaced transverse metallic members 13 of a suitable material, such as, for example, brass, having sufficient rigidity to prevent stress in the section. The members 13 are circular in configuration and have a central opening or aperture 14 aligned with the hollow pipes 10, 11. Each of the members 13 comprises a pair of parallel walls 15, 16 connected at their inner ends by a transverse wall 17 and separated throughout the remainder of their lengths. A transverse wall 18 at the outer edge of wall 15 lies parallel to the wall 17 extending a small distance beyond the wall 16. The wall 16 has a radial length slightly less than the radial length of wall 15 so that a small gap 19 is formed between the ends of the wall 16 and the transverse wall 18.

Referring now to Fig. 1a, the length of the wall 16 is made substantially equal to a quarter wave length at the frequency of the wave being propagated through the wave guides 10 and 11. Similarly, the reentrant section formed between the walls 15, 16 has a length substantially equal to a quarter wave length at this frequency. In all cases the terms "quarter wave" and "half wave" refer to a half wave length or quarter wave length in the particular wave guide configuration which is being described. This distance is not necessarily equal to one-half wave length in free space nor to one-half wave length in the connecting wave guides 10 and 11.

When two disks 13, so constructed, are placed closely together with a small spacing between their adjacent walls, they form a section of radial transmission line. The length of the section of transmission line between the inner surface of the member 17 and the middle of gap 19 is equal to a quarter wave length. This section of line is in series with the second section of radial transmission line formed by the inner surfaces of walls 15 and 16 of a given disk 13, the outer surface of wall 17 forming a short circuit at the end of this second section of transmission line. The overall length of the two serially connected sections of transmission line between the opening 14 and the outer surface of the wall 17 is equal, therefore, to a half wave length at the frequency of the wave. The short-circuit represented by the outer surface of wall 17 causes a low impedance to appear at the opposite end of this half wave section of transmission line and across the gap between the transverse walls 17 of the adjacent disks 13. At the same time, since the length of the radial transmission line between walls 16 and 15 of adjacent members 13 is equal to a quarter wave length, a high impedance is caused to occur at the gap between transverse walls 18 of adjacent disks to prohibit any power from leaking to the outside of the wave guide system through this gap. When a plurality of closely spaced disks 13 are placed together, therefore, a substantially continuous wave guide section is formed between the angularly disposed sections 10, 11. Power may be transmitted through this flexible section 12, particularly when the angle between adjacent disks 13 is relatively small, viz., of the order of a few degrees. Moreover, it has been found that the inclination of adjacent disks 13 may be made in any direction without affecting the direction of polarization of the transverse electric wave being propagated through the flexible section.

In order to support the disks 13, while at the same time providing a sufficient degree of flexibility for the section 12, each of the disks 13 is provided with a radially extending fin 20 connected to one end of the transverse wall 18. A corrugated rubber sleeve 21 is provided and the fins 20 are inserted between the corrugations of this sleeve, being supported against lateral movement by the sleeve 21. The sleeve 21 thus serves both to permit a certain degree of movement between adjacent disks and to limit the amount of this movement. The rubber sleeve 21 may be molded around the disks 13 or the disks may be inserted into the pre-formed sleeve, the rubber being stretched slightly to give the necessary spacing between disks. Moreover, the composition of the rubber sleeve 21 may be such that this sleeve is made conducting to high frequency currents so that no stray electromagnetic fields can possibly exist about the flexible section 12.

In constructing the disks 13, the walls 16 and 17 may be formed by a single punching operation. The member constituted by walls 15, 18, and 20 may similarly be formed by a single punching operation. Thereafter, these two punchings may be easily joined together by soldering the point of connection of transverse wall 17 with the wall 15. The composite flexible wave guide section, therefore, may be inexpensively constructed and rapidly assembled by virtue of the relatively small number of parts and operations involved.

In the embodiment of our invention shown in Fig. 2, a plurality of half wave length radial chokes are employed to form a flexible section of transmission line 22 connecting the angularly disposed sections 10, 11 of the wave guide system. The flexible section 22 comprises a plurality of closely spaced resilient metallic disks 23 of a suitable material, such as Phosphor bronze. The disks 23 have central apertures 24 which are aligned with the wave guide sections to which they are connected to form an extension of these guides. The radial length of each of the disks 23, that is, the radial distance between the inner and outer edges of the disks, is made equal to an electrical half wave length at the frequency of the wave being propagated through the wave guide system. Each of the disks 23 is connected at its inner edge 25 and its outer edge 26, respectively, to a different one of the adjacent disks 23. At the point 26, these adjacent disks may be hermetically sealed, as by means of a suitable solder, while at the inner edge 25, they may similarly be conductively connected by means of a soldered connection, or, as shown in Fig. 2, a short transverse wall 27 may be connected between the adjacent edges 25, use of the wall 27 being determined by the requirements as to flexibility and the degree of angular movement desired per unit length of flexible section.

In the flexible section 22, the short-circuit caused by the metallic contact at the edges 26 causes a low impedance to appear across the edges 25 of the disks not mechanically joined at these edges, the two disks 23 between the points 25 and 26 acting as a section of radial transmission line having the length required to give this desired impedance condition at this point.

In a wave guide system of the hollow pipe type employing a flexible section constructed as shown in Fig. 2 and used for propagating a wave having a wave length of the order of 3 centimeters, it was found that when the length of the section 22 was approximately 3.5 space wave lengths of the wave being propagated, the wave guide section 11 could be rotated through a solid angle of approximately 120° without the introduction of any substantial power losses through this section and with negligible reflection of the wave being propagated. It was found, furthermore, that there was negligible shift in the plane of polarization of the $TE_{1,1}$ wave being propagated as the position of the guide 11 was changed and that there was no tendency toward circular polarization of the propagated wave regardless of the position of the wave guide section 11. Since there was a very low impedance between the adjacent unconnected edges 25 of the disks 23, due to the short-circuit at the point 26 of the radial transmission line formed by these disks, no sparking occurred between the disks used. Also, since the flexible section 22 is formed as a sealed metallic bellows, this section is particularly adapted for use in systems in which difference in pressure exists between the inner and outer surfaces of the walls of the guide 10.

In Fig. 3 there is shown a curve of standing wave ratio versus frequency for a typical flexible wave guide section of our invention. The standing wave ratios used in plotting this curve are standing wave ratios in voltage, as measured by a linear detector, in a section of line at the input of the flexible section. The values represent the ratio of the voltage amplitude at a point of maximum electric field, to the voltage amplitude at a point of minimum electric field, both points being within the electric field of the transmitted wave and along a line parallel to the direction of wave propagation. This ratio is an indication of the amount of power reflected by the flexible section 22. Fig. 3 shows that throughout the total angular variation produced by the flexible section 22 and for a frequency variation of 3%, the standing wave ratio is maintained below a value of 1.1. It is apparent that such characteristics are particularly desirable in wave guide systems used to transmit ultra-high frequency energy to an antenna oscillating continuously through a given angle.

From the foregoing description, it may be seen that our invention provides a new and improved flexible section for a wave guide of the hollow pipe type which is not only easily fabricated and assembled, but permits the large angular motion, similar in action to that of a universal joint, without the introduction of any undesired power losses, reflections, or disturbances to the transverse electromagnetic wave being propagated.

While we have shown a particular embodiment of our invention, it will of course be understood that we do not wish to be limited thereto since various modifications may be made, and we contemplate by the appended claim to cover any such modifications as fall within the true spirit and scope of our invention.

What we claim as new and desire to secure by Letters Patent of the United States is:

In a gas-filled dielectric wave guide system of the cylindrical hollow-pipe type, the combination of a pair of longitudinally spaced sections of said guide along which a high frequency wave of low order and mode is to be propagated, and means for flexibly connecting said sections to permit substantial angular movement therebetween, said means comprising a plurality of circular resilient metallic disks, said disks being closely spaced and having central apertures of the same dimensions and configuration as the pipe forming said guide, the material surrounding the apertures of said disks forming substantially completely the entire conductive material extending longitudinally between said sections, the radial length of each of said disks between the inner and outer edges thereof being equal to a half wavelength at the frequency of the wave propagated along said guide to present a low impedance path between the inner edges of adjacent disks for a wave propagated in said system, each of said disks having its outer edge conductively connected by an air-tight seal to one of the disks adjacent thereto and its inner edge conductively connected to the other of the disks adjacent thereto by a similar air-tight seal.

EDWIN H. MEIER.
HUBERT J. SCHLAFLY, Jr.

REFERENCES CITED

The following references are of record in the file of this patent:

UNITED STATES PATENTS

| Number | Name | Date |
|---|---|---|
| 2,155,508 | Schelkunoff | Apr. 25, 1939 |
| 2,233,804 | Bourne | Mar. 4, 1941 |
| 2,338,441 | Kohl | Jan. 4, 1944 |
| 2,374,498 | Quayle | Apr. 24, 1945 |
| 2,407,318 | Mieher | Sept. 10, 1946 |

OTHER REFERENCES

Ser. No. 367,195, K. Kohl (A. P. C.), published May 18, 1943.